US009956867B2

(12) United States Patent
Ognjanovski, Jr. et al.

(10) Patent No.: US 9,956,867 B2
(45) Date of Patent: May 1, 2018

(54) SYSTEMS AND METHODS FOR A LATCHABLE REFUELING VALVE

(71) Applicant: Ford Global Technologies, LLC, Dearborn, MI (US)

(72) Inventors: Robert Ognjanovski, Jr., Shelby Township, MI (US); Dennis Seung-Man Yang, Canton, MI (US); Kevin Lucka, Madison Heights, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 14/830,175

(22) Filed: Aug. 19, 2015

(65) Prior Publication Data

US 2017/0050512 A1    Feb. 23, 2017

(51) Int. Cl.
*F01L 9/04*   (2006.01)
*B60K 15/035*   (2006.01)
*F02M 25/08*   (2006.01)
*F16K 31/10*   (2006.01)
*F16K 27/02*   (2006.01)
*F16K 31/06*   (2006.01)

(52) U.S. Cl.
CPC ....... *B60K 15/03519* (2013.01); *F02M 25/08* (2013.01); *F16K 27/029* (2013.01); *F16K 31/0675* (2013.01); *F16K 31/0689* (2013.01); *F16K 31/10* (2013.01); *F01L 2009/0403* (2013.01); *F01L 2009/0425* (2013.01); *F01L 2009/0428* (2013.01); *F01L 2009/0446* (2013.01)

(58) Field of Classification Search
CPC ....... F02L 2009/0403; F01L 2009/0425; F01L 2009/0428; F01L 2009/0446; B60K 15/03519; F16K 31/06; F02M 25/08
See application file for complete search history.

(56) References Cited

U.S. PATENT DOCUMENTS 8,432,242 B2   4/2013   Irwin
2010/0294251 A1*   11/2010   Makino ............. F02M 25/0836
                                                    123/519
2014/0264113 A1   9/2014   Grover
(Continued)

FOREIGN PATENT DOCUMENTS

WO   2014158993 A1   10/2014

OTHER PUBLICATIONS

Peters, M. et al., "Systems and Methods for Depressurizing a Fuel Tank," U.S. Appl. No. 14/681,831, filed Apr. 8, 2015, 56 pages.

*Primary Examiner* — Jacob Amick
*Assistant Examiner* — Charles Brauch
(74) *Attorney, Agent, or Firm* — James Dottavio; McCoy Russell LLP

(57) ABSTRACT

Methods and systems are provided for a latchable refueling valve designed to reduce noise associated with opening and closing the valve. In one example, a system may include a valve armature with first and second latch indices formed on an outer diameter of the armature. The latch indices may be rounded and configured to engage with a latch guide to enable rotation between the armature and the latch guide.

12 Claims, 7 Drawing Sheets

(56) References Cited

U.S. PATENT DOCUMENTS

2015/0102039 A1\* 4/2015 Balsdon ............... F02M 25/089
 220/562
2015/0198123 A1\* 7/2015 Pearce ............. B60K 15/03504
 123/520

\* cited by examiner

US 9,956,867 B2

SYSTEMS AND METHODS FOR A LATCHABLE REFUELING VALVE

FIELD

The present description relates generally to systems and method for a latchable refueling valve.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, for example when the engine is in operation in a hybrid vehicle, the evaporative emission control system allows the vapors to be purged into the engine intake manifold for use as fuel.

The fuel vapor canister in the hybrid vehicle may primarily store refueling vapors. Further, vapors from running loss and diurnal temperature cycles may not be transferred into the fuel vapor canister and may be contained within the fuel tank. Accordingly, pressure may build in the fuel tank and a higher pressure may exist within the fuel tank. When a vehicle operator indicates a demand to refuel the hybrid vehicle, the fuel cap may be locked until venting of the fuel tank is allowed to sufficiently reduce tank pressure. As such, the fuel cap may be unlocked only after the tank pressure is below a threshold pressure protecting the vehicle operator from being sprayed with fuel vapor.

Previously disclosed systems include a single fuel tank isolation valve (FTIV) between the fuel tank and the fuel vapor canister. The FTIV may be a solenoid valve that is normally closed but the FTIV may be opened to prepare the fuel tank for refueling. However, a constant voltage supply may be provided to energize the FTIV to open and enable depressurization of the fuel tank. As such, the constant supply of voltage to the FTIV may increase power consumption and lead to a rise in maintenance costs. Accordingly, the FTIV may be replaced with a latchable refueling valve. One example latchable refueling valve is shown by Balsdon et al in U.S. 2015/0102039. Therein, a latching mechanism of the latchable refueling valve comprises an index mechanism attached to an armature that may engage with a latch guide to adjust the valve between an open position and a closed position. The valve further includes first and second springs to achieve the adjusting between valve positions. The latchable refueling valve may reduce power consumption but may cause undesirable noises when adjusting between valve positions. Additionally, the large number of components involved with the mechanism may increase maintenance costs.

The inventors herein have recognized the above issues, and have identified an approach to at least partly address the issues. In one example approach, a latching mechanism for a valve comprises an armature including each of an upper and lower offset rounded cam element formed integrally thereon, a rotation sleeve concentrically surrounding the armature and including a plurality of cam guides, a solenoid actuator, a valve core attached to the armature and configured to transmit electromagnetic force into motion against a spring; wherein movement of the armature toward the spring engages the armature cams with the cam guides to impart rotation between the armature and the rotation sleeve, and movement of the armature away from the spring seats the valve in one of a first or second desired valve position. In this way, by reducing the number of moving components and providing rounded cam elements, noises associating with opening and closing the fuel tank isolation valve may be reduced. Additionally, by reducing the number of components in the latchable refueling valve, maintenance costs may be reduced.

As one example, when the latch indices engage the rotation sleeve, the rounded ends of the cam elements may create less noise when engaging with the planar surfaces of the cam guide by reducing the area of contact between the two components. Additionally, by reducing the number of axially moving components of the mechanism to only the armature, a single spring in combination with the solenoid actuator may control the axial motion, thereby reducing the number of parts in the valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-5 are shown approximately to scale

DETAILED DESCRIPTION

Figure 1:
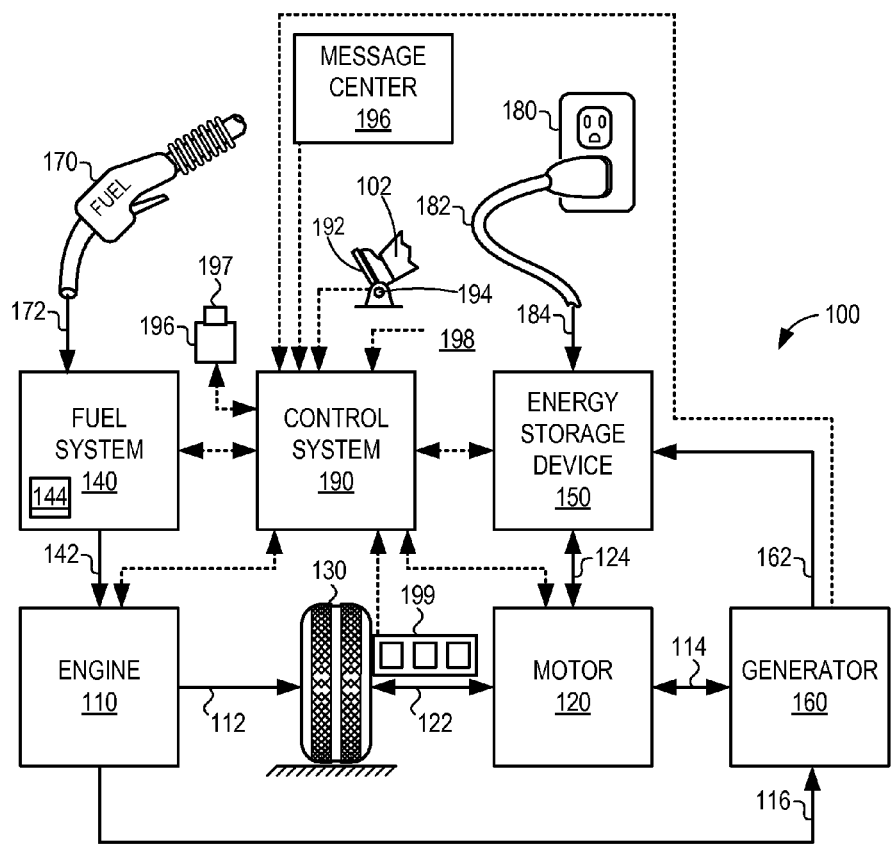
FIG. 1 shows an example vehicle propulsion system.
Figure 2:
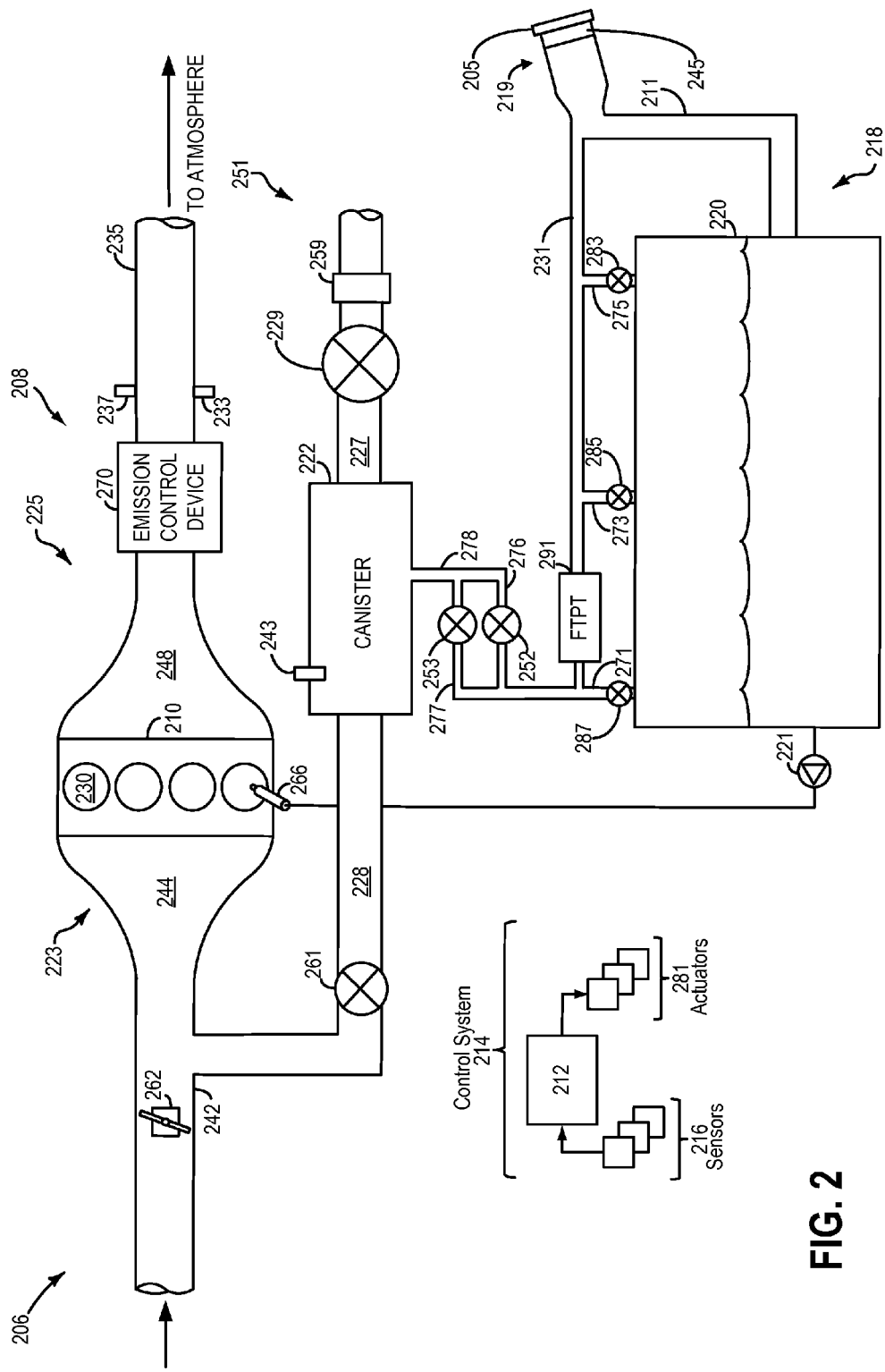
FIG. 2 shows an example vehicle system with a fuel system and an evaporative emissions system.
Figure 4:
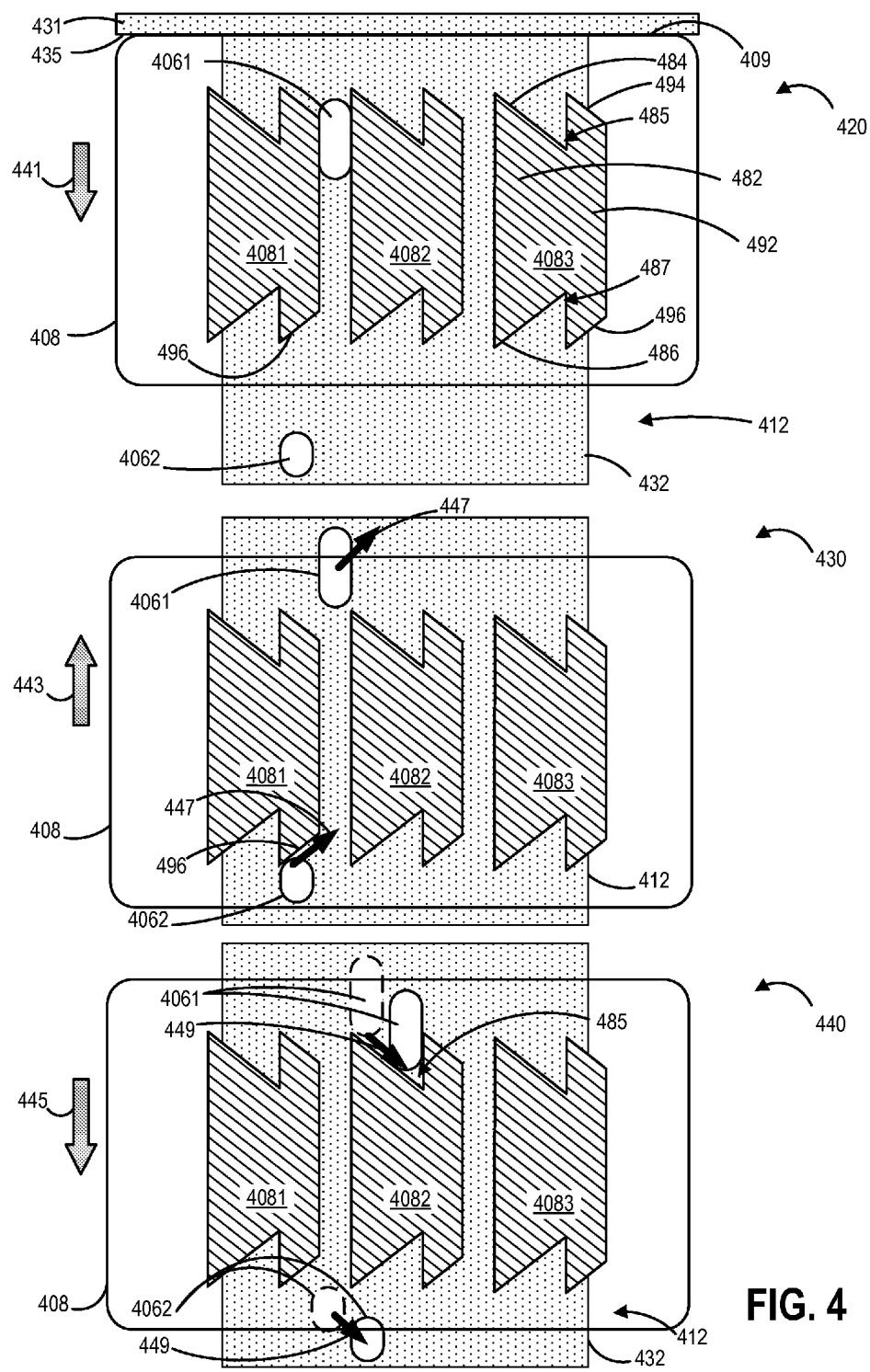
FIG. 4 schematically shows adjusting the latchable refueling valve to a latched open position.
Figure 5:
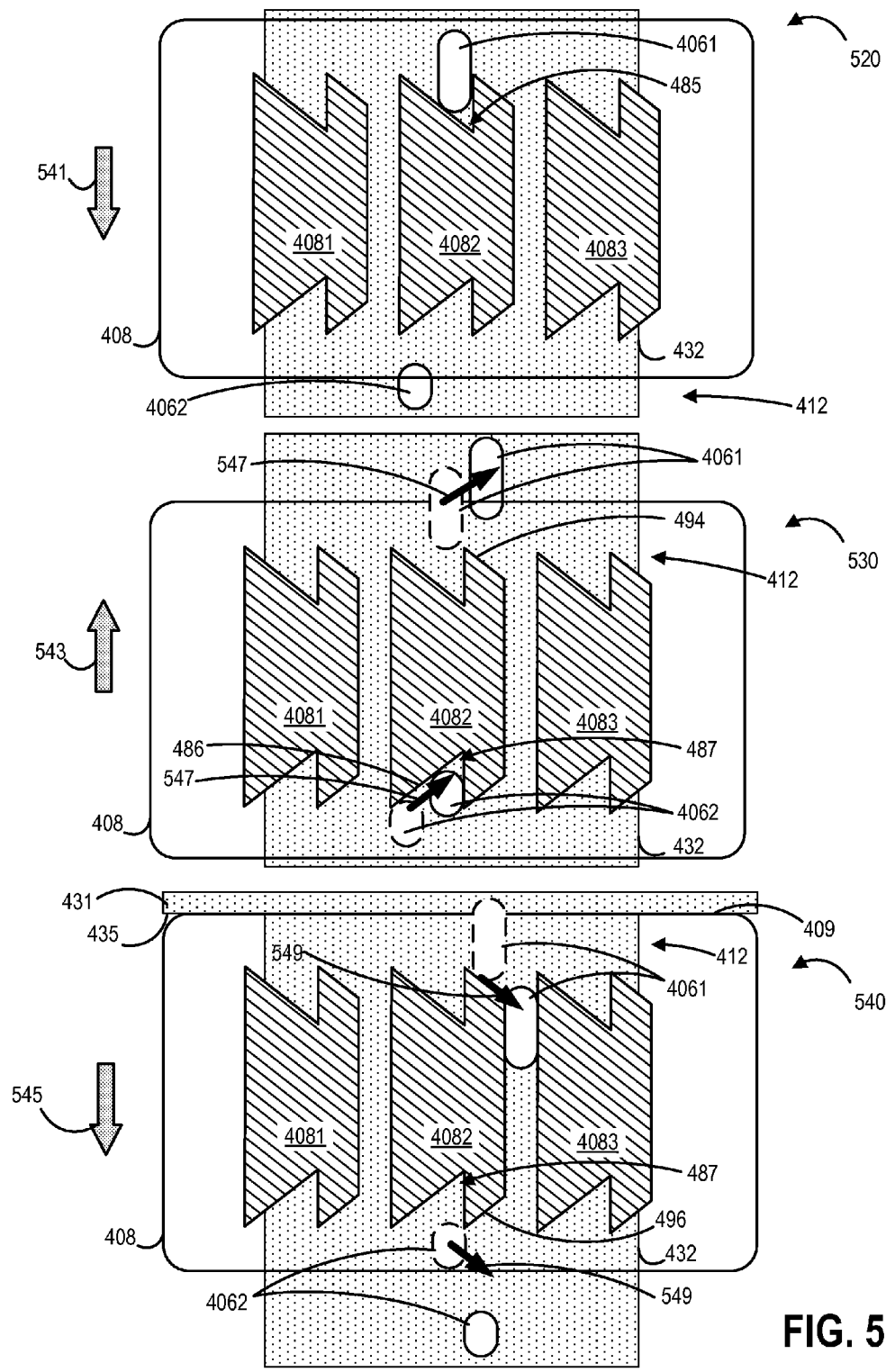
FIG. 5 schematically depicts adjusting the latchable refueling valve to an unlatched closed position from the latched open position.
Figure 6:
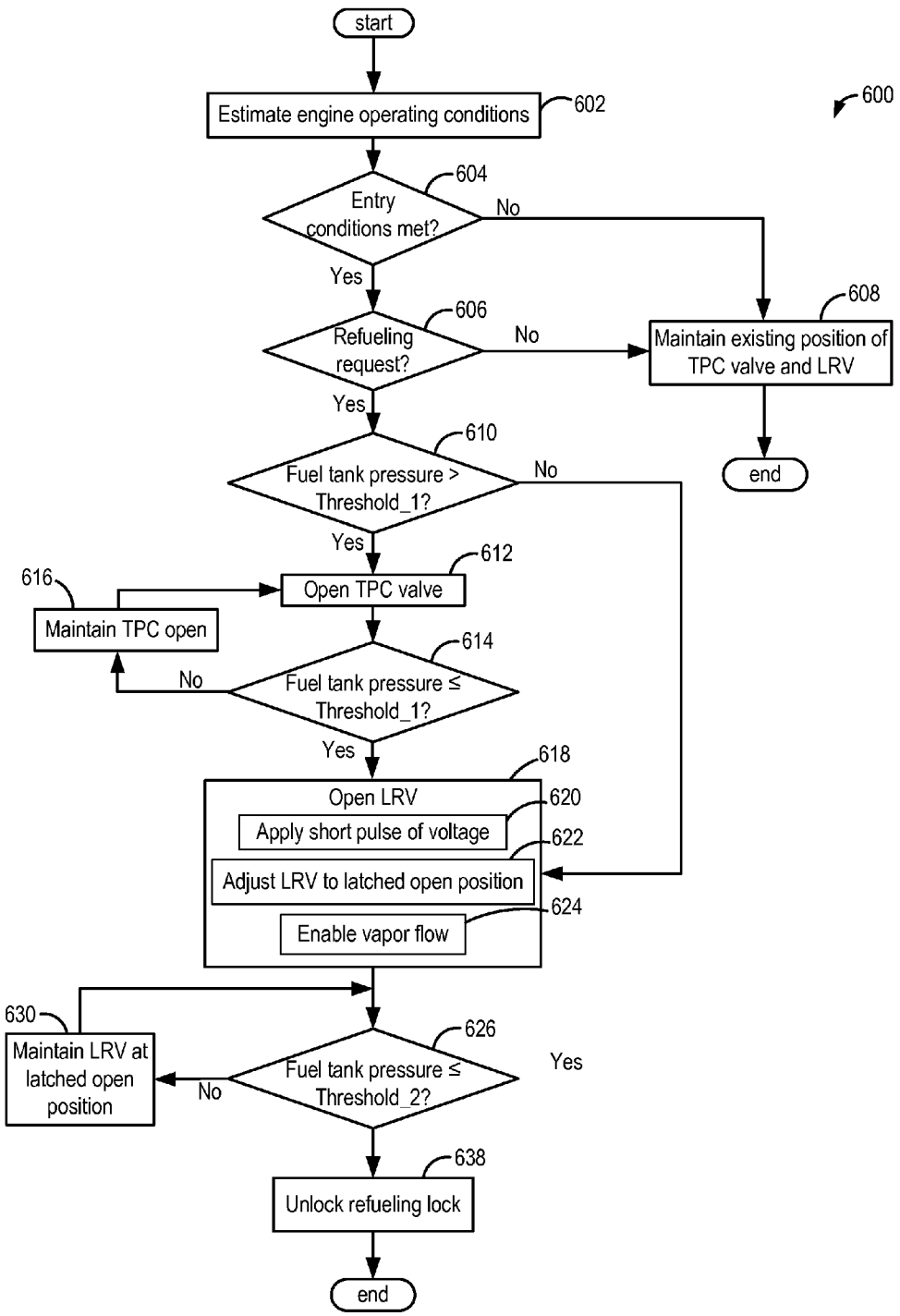
FIG. 6 shows an example flowchart for depressurizing a fuel tank in response to a tank refueling request, in accordance with the latching mechanism of the present disclosure.
Figure 7:
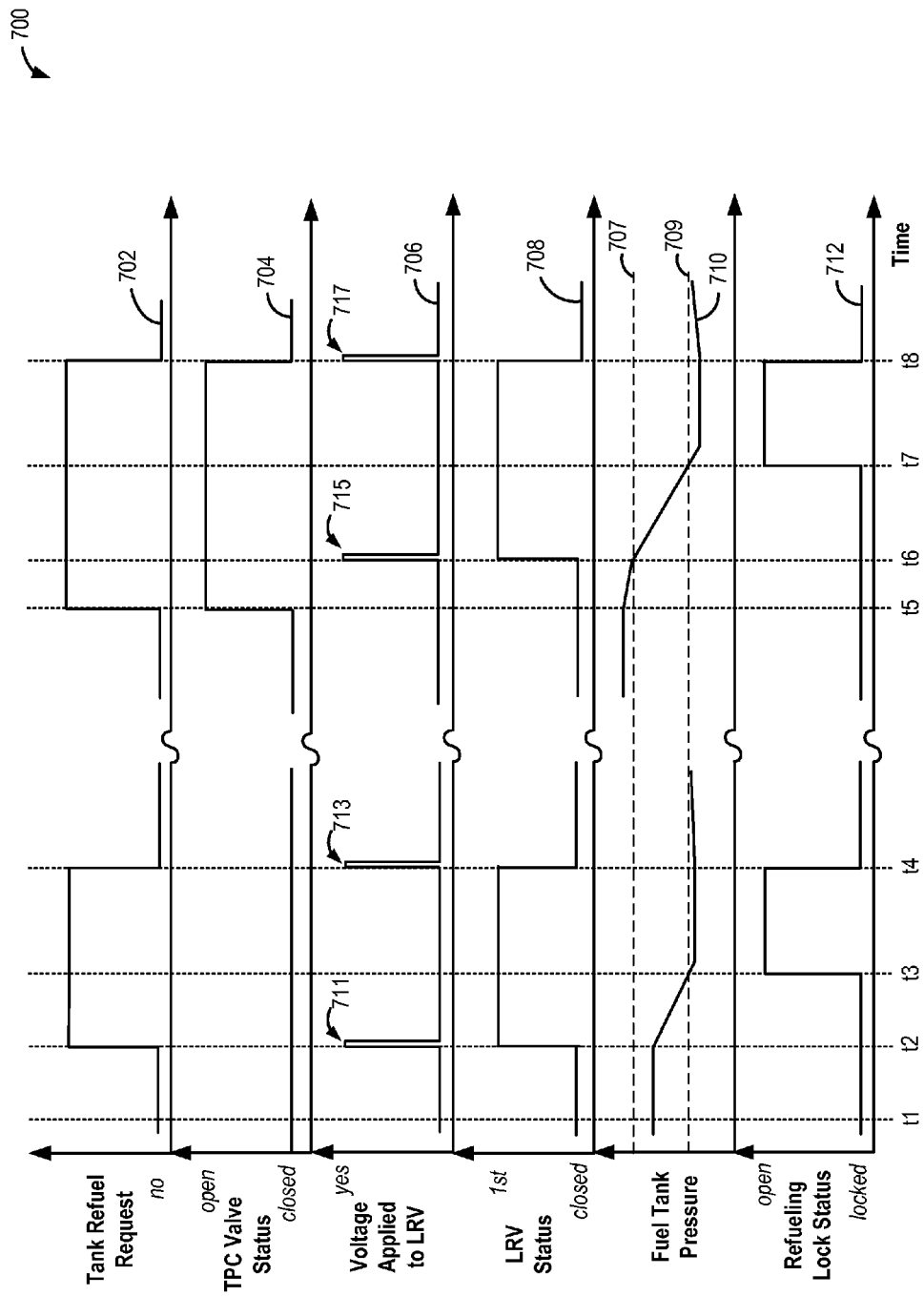
FIG. 7 shows an example timeline for depressurizing a fuel tank in response to a tank refueling request according to the present disclosure.

The following description relates to systems and methods for a latchable refueling valve. The latchable refueling valve may be included as part of a fuel system in a vehicle, such as a hybrid electric vehicle, as shown in FIG. 1. Specifically, the fuel system may include an evaporative emissions system, as shown in FIG. 2. The latchable refueling valve includes a movable armature with first and second latch indices formed integrally thereon (FIG. 3) configured to mechanically couple with a latch guide. The latchable refueling valve may be adjusted from an unlatched closed position to a latched open position via a first pulse of voltage (FIG. 4). Further, the latchable refueling valve may be adjusted from the latched open position to the unlatched closed position by a second pulse of voltage (FIG. 5). Noises associated with adjusting the latching mechanism shown at FIGS. 4-5 may be reduced by the rounded design of the latch indices of the valve. Fuel pressure within the fuel tank may rise substantially due to diurnal vapors and hot ambient conditions. Accordingly, a refueling request by a vehicle operator may initiate depressurization of the fuel tank. First, the tank pressure control valve may be opened to reduce fuel tank pressure below a first threshold, followed by adjusting the latchable refueling valve to the latched open position to reduce fuel tank pressure below a second pressure threshold (FIG. 6). The latched open position of the LRV may provide a faster flow rate than the open position of the tank pressure control valve, and fuel tank depressurization may thereby be expedited (FIG. 7).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 7, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container such as fuel vapor canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe 211 or neck 211.

Further, fuel filler system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218. Fuel vapor canister 222 may also be termed canister 222 herein.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an optional air filter 259 disposed therein upstream of canister 222. Flow of air and vapors between canister 222 and the atmosphere may be regulated by a canister vent valve 229.

As depicted, fuel tank 220 is fluidically coupled to canister 222 via two conduits: a first conduit 276 and a second conduit 277. A tank pressure control (TPC) valve 252 (or TPC valve 252) is included within first conduit 276 while second conduit 277 includes latchable refueling valve 253 (LRV 253). First conduit 276 and second conduit 277 may merge to form canister entry conduit 278.

Canister vent valve 229 may be a normally open valve, so that TPC valve 252 and LRV 253 may control venting of fuel tank 220 with the atmosphere. TPC valve 252 and LRV 253 may be normally closed valves, that when opened, allow for the venting of fuel vapors from fuel tank 220 to canister 222. Fuel vapors may be stored in canister 222 while air stripped off fuel vapors exits into atmosphere via canister vent valve 229. Stored fuel vapors in the canister 222 may be purged to engine intake 223, when engine conditions permit, via canister purge valve 261.

Prior art examples may include a single fuel tank isolation valve (FTIV) coupled between fuel tank 220 and fuel canister 222 (or between fuel tank 220 and purge line 228 or vent line 227). However, a continuous supply of voltage may be demanded by the FTIV when it is held open to depressurize the fuel tank. This continuous voltage may increase power consumption. In contrast, the example vehicle system in FIG. 2 depicts fuel system 218 fluidically coupled to emission control system 251 by each of TPC valve 252 and LRV 253. Both TPC valve 252 and LRV 253 may be solenoid valves. TPC valve 252 may have a smaller orifice and a smaller aperture than LRV 253. LRV 253 may be configured to allow a higher flow rate than TPC valve 252.

Further, LRV 253 includes a latch that can be modulated to different positions via finite pulses of voltage, as will be explained in reference to FIGS. 4 and 5. Specifically, LRV 253 can be opened by adjusting the latch on a latch guide such that the LRV is in a latched open position with a first finite pulse of voltage. When the LRV 253 is to be closed, the latch may be shifted to enable the unlatched closed position via a second finite pulse of voltage. As such, a stator and armature within LRV 253 may be energized for shorter durations to transition the LRV from the latched open position to the unlatched closed position and vice versa. To elaborate, the LRV may receive power exclusively to transition from the unlatched closed position to the latched open position and from the latched open position to the unlatched closed position. The LRV may not receive power to be maintained in either the latched open position or the unlatched closed position. Accordingly, the LRV may provide a reduction in power consumption.

During refueling events, and when pressure in fuel tank 220 is higher than a first pressure threshold, TPC valve 252 may be opened to decrease the pressure in fuel tank 220 to the first pressure threshold. As mentioned earlier, TPC valve 252 may have a smaller orifice diameter than the orifice diameter of LRV 253. Thus, by opening TPC valve 252 first, the pressure in the fuel tank may be bled down gradually until the first pressure threshold is attained. LRV 253 may then be opened to vent fuel vapors from fuel tank 220 to canister 222 at a faster rate. As such, the LRV 253 may be adjusted to the latched open position from the unlatched closed position. LRV 253 may be a normally closed (e.g., unlatched closed) valve that is opened in response to certain conditions. For example, LRV 253 may be actuated to the latched open position when the pressure in fuel tank 220 is at or below the first pressure threshold.

The refueling lock, however, may be unlocked to open a fuel cap only after fuel tank pressure attains a second pressure threshold. Fuel tank pressure at which the LRV 253 is opened (e.g., the first pressure threshold) may be higher than the fuel tank pressure when the refueling lock 245 is unlocked (e.g., the second pressure threshold). A routine for a refueling operation according to the present disclosure is described herein and with reference to FIG. 6.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include fuel injector 266, throttle 262, LRV 253, TPC valve 252, pump 292, and refueling lock 245. The control system 214 may include a controller 212. The controller may receive input data from the various sensors, process the input data, and trigger the actuators in response to the processed input data based on instruction or code programmed therein corresponding to one or more routines. For example, adjusting the position of the LRV 253 between open and closed, or vice-versa, may include adjusting a solenoid actuator included therein to adjust a relative positioning of an armature and a latch guide, as described in further detail below. An example control routine is described herein with regard to FIG. 6. The controller 212 receives signals from the various sensors of FIG. 2 and employs the various actuators of FIG. 2 to adjust engine operation based on the received signals and instructions stored on a memory of the controller.

Thus FIG. 2 may depict a fuel system 200 for a hybrid-electric vehicle, comprising at least: an engine, a fuel tank coupled to a fuel vapor canister via each of a first conduit and a second conduit, a tank pressure control valve coupled in the first conduit between the fuel tank and the fuel vapor canister; a latchable refueling valve coupled in the second conduit between the fuel tank and the fuel vapor canister (e.g., as described in further detail with reference to FIG. 3); and a controller configured with instructions stored in non-transitory memory and executable by a processor for depressurizing the fuel tank in response to a refueling request (e.g., as described in further detail with reference to FIGS. 6-7).

Figure 3:
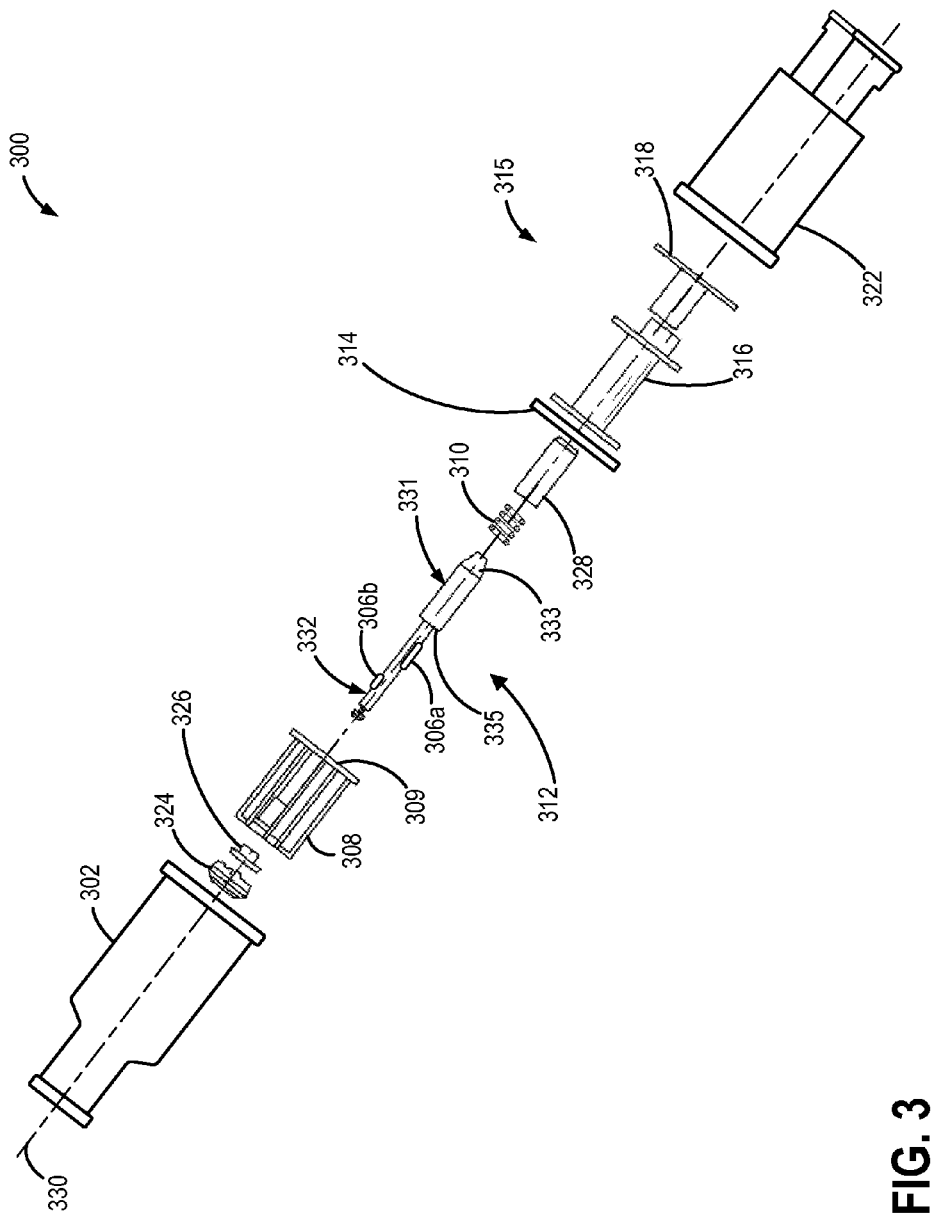
FIG. 3 shows an exploded view of a latchable refueling valve included within the evaporative emissions system of the example vehicle system of FIG. 2.

Turning now to FIG. 3, it shows an exploded view 300 of a latchable refueling valve (LRV), such as LRV 253 of FIG. 2. LRV of FIG. 3 includes a cap 302 that may be fluidically coupled to a fuel tank of a vehicle, such as fuel tank 220 of FIG. 2. Overmold 322 may be coupled to a fuel vapor canister, such as canister 222 of FIG. 2. Further, the cap and overmold may be coupled to each other, e.g., mechanically, and may enclose various components of the LRV within.

As depicted in exploded view 300, the latchable refueling valve of FIG. 3 has a central axis 330. It will be appreciated that the central axis of latch guide 308, the central axis of armature 312, and the central axis of bobbin 316 may be the same as central axis 330. It will be appreciated that the central axis extends in an axial direction with reference to the valve components, and that an upper end or an upper axial end of a component may be disposed along the central axis 330 further toward overmold 322, while a lower end or a lower axial end of a component may be disposed along the central axis 330 further toward cap 302.

The LRV depicted in FIG. 3 is a solenoid valve, and accordingly includes armature 312 and stator assembly 315, which may herein also be referred to as valve core 315. Stator assembly 315 comprises lower stator 314 and upper stator 318. Of these, upper stator 318 alone may be magnetically conductive. Alternatively, each of lower stator 314 and upper stator may be magnetically conductive. Stator assembly 315 also includes an electric coil (not shown) wound around bobbin 316. The electric coil may be coupled to a source of electricity such as a battery in a vehicle via a number of electronic terminals (not shown). In the example of the hybrid vehicle system of FIG. 1, the electric coil may receive a supply of electricity from energy storage device 150. When a voltage (and current) is supplied to the electric coil, upper stator 318 may be magnetized and the armature 312 may be drawn towards the upper stator 318. Put another way, valve core 315 may be configured to transmit electromagnetic force into motion against a spring (e.g., spring 310), as described in further detail with reference to FIGS. 4-5. As such, upper stator 318 may be fitted into a bore within bobbin 316. Further, at least a first portion of armature 312 may be enclosed within sleeve 328. In turn, sleeve 328 may be surrounded at least partially by each of bobbin 316 and upper stator 318.

Armature 312 may include an upper armature portion 331 with a first, larger outer diameter and a lower armature portion 332 with a second, smaller outer diameter. Upper axial surface 333 of upper armature portion 331 may be tapered, and may be coupled to spring 310. In some examples, spring 310 may be housed within sleeve 328. When compressed, spring 310 may exert a downward force on armature 312 via the upper axial surface 333, and when extended, spring 310 may exert an upward force on armature 312 via the upper axial surface. In some examples, lower axial surface 335 of upper armature portion 331 may be in face-sharing contact with (e.g., latched against) an upper axial face or upper axial end 309 of latch guide 308 when the LRV is in an unlatched closed position. The face-sharing contact may be maintained via a force applied by spring 310, as described in further detail herein.

Lower armature portion 332 may be formed to couple (e.g., mechanically) to each of poppet 324 and insert 326. Latch guide 308 may encircle (e.g., concentrically surround) at least a portion of second end 332 of armature 312. It will be appreciated that latch guide 308 may not be configured to surround any part of upper armature portion 331. As such, a central axis of latch guide 308 may be the same as a central axis of armature 312 and a central axis of bobbin 316.

The lower armature portion 332 includes a first (e.g., upper) latch index 306a and a second (e.g., lower) latch index 306b that enable the second end 332 of armature 312 to be latched onto latch guide 308. First latch index 306a and second latch index 306b may enable the LRV to transition from a latched open position to an unlatched closed position. To elaborate, upper latch index 306a may be latched onto a cam guide within latch guide 308 (e.g., a tooth element formed integrally from the latch guide) when the LRV is in a latched open position. As a further example, lower latch index 306b may press against a cam guide (e.g., a tooth element) of latch guide 308 when the LRV is transitioning from the closed position to the open position, or vice-versa, to impart rotation between armature 312 and latch guide 308. For this reason, latch guide 308 may herein be referred to as rotation sleeve 308. The latching interactions between latch indices 306a and 306b and latch guide 308 are described in further detail with reference to FIGS. 4-5.

As shown, each of latch indices 306a and 306b are formed integrally on lower armature portion 332 of armature 312. In other words, lower armature portion 332 may comprise a first latch index 306a and a second latch index 306b. First and second latch indices 306a and 306b may be of an elongated capsule shape. That is to say, the indices may comprise straight sides with rounded axial ends. Put another way, upper latch index 306a and lower latch index 306b may be upper and lower rounded cam elements. In this way, the straight sides of the latch indices may allow for slidable movement between first and second components included within latch guide 308, while the rounded axial ends allow for reduced noise when contacting planar surfaces of latch guide 308, as described below in further detail. In other examples, first and second latch indices 306a and 306b may be of an alternate shape which includes rounded axial ends, and which are complementary to a shape of latch guide 308.

First latch index 306a may be axially positioned further toward upper portion 331 of armature 312, and second latch index 306b may be axially positioned further away from upper portion 331 of armature 312. The axial extents of first and second latch indices 306a and 306b do not overlap. Additionally, first latch index 306a may be at a first angular position about the central axis of armature 312, and second latch index 306b may be at a second angular position about the central axis of armature 312. That is to say, the position of first latch index 306a may be offset (e.g., angularly offset) from the position of second latch index 306b. In this way, a latching mechanism may be achieved in conjunction with latch guide 308, as described in further detail with reference to FIGS. 4-5. By forming latch indices integrally with armature 312, a number of parts within the LRV may be reduced. Thus, manufacturing costs of the latchable refueling valve may be reduced.

A spring 310 may be positioned within sleeve 328 atop armature 312. Specifically, a first end of spring 310 may be coupled to (e.g., nonreleasably attached to) and in direct contact with armature 312 at the upper axial surface 333 of upper armature portion 331. Additionally, a second end of spring 310 may be affixed to a flange of bobbin 316. Spring 310 may be positioned opposite to armature 312 relative to latch guide 308. As will be described further herein, spring 310 may facilitate the positioning (e.g., axial movement) of armature 312 into and out of a latched open position with respect to latch guide 308. In one example, spring 310 may effect movement of armature 312 away from the spring via a decompressive (e.g., downward) spring force, said movement seating the valve in one of a latched open or unlatched closed position.

It will be noted that the axial position of latch guide 308 may be fixed, and latch guide 308 may not be configured to rotate around its central axis. Put another way, latch guide 308 may be configured to be stationary. Conversely, armature 312 may move axially and may be configured to rotate around its central axis. First and second latch indices 306a and 306b formed on the armature may be shifted from a first location (e.g., of the latched open position) on the latch guide and adjusted to a second location (e.g., for an unlatched closed position) on the latch guide to provide a change in position of the LRV. Thus, in a first example, adjusting the position of the LRV may include a fixed armature 312 imparting rotation of the rotation sleeve (e.g., latch guide 308) from a first angular position to a second angular position.

In an alternate configuration, armature 312 may move axially but may have a fixed angular position (i.e., armature 312 may not be configured to rotate about its central axis). Put another way, the angular position of the armature may be configured to be stationary. Conversely in the alternate configuration, latch guide 308 may be provided with a constrained range of axial motion (e.g., may move within a threshold axial distance from an equilibrium axial position) and may be configured to rotate around its central axis. In the alternate configuration, axial motion of the first and second latch indices 306a and 306b formed on the armature may shift latch guide 308 from a first angular position (e.g., of the latched open position) to a second angular position (e.g., for an unlatched closed position) on the latch guide to provide a change in position of the LRV. Thus, in a second example, adjusting the position of the LRV may include a fixed rotation sleeve imparting rotation of the armature from a first angular position to a second angular position.

It will also be noted that poppet 324, insert 326, armature 312 (including latch indices 306a and 306b), and latch guide 308 may be enclosed within cap 302. An orifice of the latchable refueling valve may be included within cap 302 (not shown). Fuel vapors from the fuel tank may flow via the orifice of the latchable refueling valve towards the canister when the latchable refueling valve is opened. Conversely, fuel vapor flow from the fuel tank to the fuel vapor canister may be blocked when the latchable refueling valve is closed.

When the LRV is energized (specifically, when the upper stator of the LRV is magnetized), the armature 312 is drawn towards the upper stator 318. The LRV may be energized for a brief moment via a voltage pulse. Because the lower latch index 306b is formed integrally on the armature 312, the lower latch index 306b is simultaneously drawn in a direction towards the bobbin 316. As the index 306b is in direct contact with latch guide 308, the upper latch index 306a is shifted off the first location in the latch guide 308, towards the direction of the bobbin 316. At the same time, the latch guide 308 is rotated by the lower latch index, thereby aligning the upper latch index with a second angular position of the latch guide. When the LRV is de-energized at the end of the voltage pulse, the upper stator is de-magnetized and the armature is moved toward a second axial position via a spring force from spring 310. At the same time, the upper latch index slides into a second location on the latch guide. The first location of the latch on the latch guide may enable a latched open position of the LRV while the second location on the latch guide may enable an unlatched closed position of the LRV. Alternatively, the first location of the latch on the latch guide may enable the unlatched closed position of the LRV while the second location on the latch guide may enable the latched open position of the LRV.

Turning now to FIGS. 4 and 5, they depict transitioning a latchable refueling valve (LRV) such as LRV 253 of FIG. 2 between a closed, and an open position. Put another way, FIGS. 4 and 5 depicting adjusting the valve position between a closed position and an open position. Specifically, FIG. 4 illustrates a transition of the LRV from an unlatched closed position to a latched open position, and FIG. 5 depicts a transition from the latched open position to the unlatched closed position.

It will be appreciated that the term "latched valve position" or "latched position" may refer to valve positions wherein component latch index of armature 412 is pressed or seated against an internal component of latch guide 408 in such a way that further downward axial motion is constrained (e.g., prevented), and further wherein the valve is de-energized (e.g., current is not travelling through the solenoid actuator, or voltage across the solenoid actuator is substantially equal to zero). It will be appreciated that a latched position does not include valve positions wherein further downward axial motion is constrained via an armature surface (e.g., 335 at FIG. 3) being seated against an external surface of the latch guide (e.g., 309 at FIG. 3). Thus, as depicted at FIGS. 4-5, the closed position of the LRV contemplated is not a latched closed position because neither latch index of the armature is pressed downward against an internal component of the latch guide to constrain downward axial motion.

The schematic depictions in FIGS. 4 and 5 include specific components of the LRV such as a latch guide 408, and armature 412 including first and second latch indices 4061 and 4062. As such, latch guide 408 and armature 412 may respectively be similar to latch guide 308 and armature 312 of exploded view 300 in FIG. 3. Specifically, armature 412 depicted at FIG. 4 includes a lower armature portion 432 and an upper armature portion 431 respectively similar to lower armature portion 332 and upper armature portion 331 of armature 312 shown at exploded view 300 in FIG. 3. Further, first latch index 4061 may be similar to upper latch index or first rounded cam element 306a, second latch index 4062 may be similar to lower latch index or second rounded cam element 306b, respectively, of exploded view 300 in FIG. 3.

All views of FIGS. 4 and 5 show three cam guides of the latch guide 408, labeled 4081, 4082, and 4083. As shown, the cam guides may be toothed elements or latch teeth of latch guide 408, and may herein be referred to as such. Teeth 4081, 4082, and 4083 may be evenly and circumferentially distributed at a common inner radius of latch guide 408. As shown, armature 412 may be concentrically surrounded by the teeth 4081, 4082, and 4083 of latch guide 408. The latch guide may have additional teeth, without departing from the scope of this disclosure. Further, all views of FIGS. 4 and 5 depict a single pair of latch indices 4061 and 4062. However, armature 412 may include additional pairs of latch indices with the same relative axial and angular positions as shown between latch indices 4061 and 4062 without departing from the scope of this disclosure.

With reference to latch tooth 4083 at view 420 of FIG. 4, each tooth of latch guide 408 includes a first prong 482 and a second prong 492. The first prong 482 includes an upper angled surface 484 and a lower angled surface 486. Similarly, second prong 492 includes an upper angled surface 494 and a lower angled surface 496. It will be appreciated that each angled surface is at an angle with respect to a central axis of armature 412 (e.g., the central axis running up and down the page at FIGS. 4-5), but is not perpendicular to the central axis of armature 412. It will be appreciated that the first and second upper angled surfaces 484 and 494 are parallel to each other, and likewise with the first and second lower angled surfaces 486 and 496. It will be further appreciated that in some examples, the upper angled surfaces 484 and 494 are perpendicular to the lower angled surfaces 486 and 496. Formed between the first and second prongs 482 and 492 is an upper notch 485 and a lower notch 487. For example, upper notch 485 may be formed between the first upper surface 484 and the second prong 492 of a latch guide tooth. Similarly, lower notch 487 may be formed between the first lower surface 486 and the second prong 492 of the latch guide tooth. It will be appreciated that each latch guide tooth has similar features and thus the same reference characters are used to identify similar features of each latch guide tooth. It will be appreciated that each of the latch tooth surfaces are substantially planar (e.g., flat).

In this way, if a latch index is engaged (e.g., in face-sharing contact with) with an angled latch tooth surface, motion of the latch index along the central axis and toward the angled surface may be conveyed into rotational motion between the armature and the latch guide. For example, downward motion of upper latch index 4061 against a first upper angled surface 484 may result in motion of the latch index toward upper notch 485 of the latch tooth. Similarly, upward motion of lower latch index 4062 toward a first lower angled surface 486 may result in motion of the latch index toward lower notch 487 of the latch tooth.

As shown at FIGS. 4 and 5, first and second latch indices 4061 and 4062 include rounded axial (i.e., top and bottom) ends. Conversely, as discussed above, the plurality of faces of the top and bottom surfaces of teeth 4081, 4082, and 4083 of latch guide 408 are planar. In this way, when armature is in a latched open position, first latch index 4061 may not be flush with a top face of a tooth of latch guide 408. Additionally, when second latch index 4062 presses against a bottom face of a tooth of latch guide 408, the pressing may not involve a flush contact between the index surface and the tooth surface due to the differing shapes. By reducing the amount of face-sharing contact between latch indices 4061 and 4062 and the surfaces of the teeth of latch guide 408, noises resulting from the mechanical coupling and uncoupling of the latch indices and the latch guide may be reduced. Put another way, fuel system NVH associated with the opening and closing of the LRV may be reduced. In this way, customer satisfaction may be increased.

As described above, transitioning from the latched open position to the unlatched closed position or vice-versa may include a rotation (e.g., a change in angular position or orientation) of one or more components of the LRV. Specifically, in a first configuration, armature 412 may rotate and latch guide 408 may not rotate in response to contact between second latch index 4062 and the bottom surface of one of the teeth of latch guide 408, and in a second configuration, latch guide 408 may rotate in response to said contact while the angular position of armature 412 is maintained. To indicate said rotation, a number of arrows (e.g., arrow 447) are included herein to represent the rotation and axial translation. It will be appreciated that said arrows may indicate relative motion between two valve components, and do not specify which component undergoes rotation or axial translation. As a specific example, with reference to view 420, arrow 447 (or the horizontal component thereof) represents relative motion between armature 412 and latch guide 408 that may be realized as a rotation of armature 412 in a first direction, a rotation of latch guide 408 in the direction opposite the first direction, a combination thereof, etc. Thus, while the language used herein describes the rotation as the armature 412 rotating in a first direction about a fixed rotation sleeve 408, it will be appreciated that the relative motion may also be realized by rotation sleeve 408 rotating in the opposite, second direction about a fixed armature 412.

As used herein, the "top" of the LRV refers to the end of the valve toward stator assembly 315, and the "bottom" of the LRV refers to the end of the valve toward poppet 324. As an example, with reference to exploded view 300 at FIG. 3, first end 331 of armature 312 is situated toward the top end of the LRV and second end 332 of armature 312 is situated toward the bottom end of the LRV. Similarly, the term a first valve component may be referred to as above a second valve component if it is further toward the top of the LRV, and a first valve component may be referred to as below a second valve component if it is further toward the bottom of the LRV.

FIG. 4 shows first view 420, second view 430, and third view 440 which represent subsequent movements of the latch indices relative to the latch guide. As such, second view 430 may follow first view 420, while third view 440 may succeed second view 430. Specifically, first view 420 represents component positions of the LRV when the LRV is in an unlatched closed position. Second view 430 shows component positions of the LRV when a finite pulse of voltage is applied to the LRV and third view 440 depicts component positions of the LRV when the finite pulse of voltage ends, resulting in a latched open position of the LRV. It will be appreciated that the time duration for the transition from first view 420 to third view 440 may be significantly short. For example, the LRV may be adjusted to the latched open position from the unlatched closed position in milliseconds (e.g., a duration of a voltage pulse).

First view 420 indicates the depicted components of the LRV when the LRV is in the unlatched closed position. Further, the LRV is not energized in first view 420. As one example, a spring (e.g., spring 310 at FIG. 3) that is coupled to and positioned above armature 412 may be compressed, and thereby may apply a downward force (as indicated by arrow 441) on the armature to maintain contact between the latch guide 408 and surface 435 of the armature. It will be appreciated that surface 435 may be similar to surface 335 of armature 312 in the LRV exploded view 300 at FIG. 3.

Herein, first latch index 4061 is positioned between two adjacent teeth of latch guide 408 (e.g., first location). As such, relative rotational motion between armature 412 and latch guide 408 is constrained (e.g., prevented) in the unlatched closed position. Also herein, second latch index 4062 is positioned beneath one of the two adjacent teeth of latch guide 408. To elaborate, first latch index 4061 of armature 412 is located between a first tooth 4081 and a second tooth 4082, while second latch index 4062 is located beneath the second lower surface 496 of the first tooth 4081.

Thus, a first (e.g., unlatched closed) position of the LRV includes an axial surface of the armature pressed against (e.g., seated on) an exterior surface of the latch guide via a decompressing spring force. The first position further includes the upper cam element (e.g., latch guide 4061) positioned between the second prong of a first cam guide (e.g., second prong 492 of latch tooth 4081) and a first prong of a second cam guide (e.g., first prong 482 of latch tooth 4082).

When the latched open position of the LRV is desired, e.g. when depressurizing the fuel tank after the first pressure threshold is attained, the LRV may be energized, as shown in second view 430. As mentioned earlier, a finite voltage pulse may be supplied (e.g., initiated) to the LRV which magnetizes the upper stator within the LRV (refer to FIG. 3). As one example, the magnitude of the finite voltage pulse may be great enough to overcome any resistance of the spring force represented by arrow 441 at view 420. In response to the voltage pulse, the armature 412 is pulled away from the cap of the LRV (e.g., 302 at FIG. 3) and towards bobbin (e.g., 316 at FIG. 3).

This change in position of the armature is depicted in second view 430, wherein armature 412 is shown moving upwards (e.g., as represented by arrow 443) in the direction of the bobbin. First latching index 4061 is moved upward out of its first location between tooth 4081 and tooth 4082. The upward motion also brings second latching index 4062 in direct (e.g., face-sharing) contact with the second bottom surface 496 of latch guide tooth 4081. The angle of contact between latching index 4062 and second bottom surface 496 induces relative rotational motion between armature 412 and latch guide 408 upon further upward motion of the armature (as induced by the voltage pulse). Specifically, first and second latch indices 4061 and 4062 are moved away from first tooth 4081 and toward second tooth 4082, as indicated by arrow 447. Simultaneously, spring 410 may be strongly compressed (e.g., more compressed than at view 420). Thus, the LRV may be unlatched and energized at second view 430.

It will be thus appreciated that movement from the closed position to the open position includes movement of the armature toward the spring that engages the lower cam element (e.g., latch index 4062) with the second lower angled surface of a first cam guide (e.g., surface 496 of latch tooth 4081), said movement imparting rotation of the cam elements (e.g., each of latch indices 4061 and 4062) away from the first cam guide.

It will be further appreciated that actuating the LRV to a latched open position includes engaging the lower surface of a first latch guiding tooth (e.g., surface 496 of tooth 4081) with the lower latch index of the armature, thereby aligning the upper latch index with a notch at least partially formed by the upper surface of a second latch guiding tooth (e.g., notch 485 of tooth 4082).

Third view 440 demonstrates a de-energized LRV in the latched open position. Third view includes two positions of the armature 412 relative to the latch guide 408. A first unlatched position, as indicated by the dashed-outline latch indices 4061 and 4062, is at the moment when the LRV is de-energized, and a subsequent latched open position, indicated by the solid-outline latch indices, is after subsequent downward and rotational movement induced by a spring.

As the LRV is de-energized from second view 430, the pulse of voltage is terminated and armature 412 moves downward, for example via a force applied by a decompression of a spring (represented by arrow 445). As the first latch index 4061 moves downward from the unlatched position above the second latch tooth it comes into contact with an angled planar surface at the top end of latch guide tooth 4082. Specifically, the first latch index 4061 comes into contact with first upper surface 484 of the second tooth 4082. The angled surface 484 redirects the downward motion of the armature in to rotate the latch indices 4061 and 4062 further away from first tooth 4081 (e.g., toward the right of the observer), as indicated by arrows 449. The first latch index 4061 then rotates and drops downward into a latched open position within upper notch 485 of second tooth 4082. The first latch index 4061 may be seated against the second tooth 4082 via a spring force, thereby constraining further downward axial motion of the armature. Additionally, the latched open position of second latch index 4062 is directly below first lower angled surface 486 of second tooth 4082, thereby enabling a rotation of armature 412 upon a subsequent energization of the LRV, as described with reference to view 520 at FIG. 5.

At this latched open position of the LRV, fuel vapors may flow from the fuel tank into the fuel vapor canister via the orifice of the LRV. By latching the latch index in a notch of the latch tooth (e.g., restricting the rotational movement of the armature relative to the latch guide) inadvertent closing of the LRV may be reduced. It will be appreciated that noise associated with the contact of first latch index 4061 and the planar surfaces of the latch guide tooth may be reduced by the rounded design of the latch index.

It will be thus appreciated that movement from the closed position to the open position further includes movement of the armature away from the spring that engages the upper cam element (e.g., latch index 4061) with the first upper angled surface of the second cam guide (e.g., surface 484 of latch tooth 4082), said movement imparting rotation between the armature and the latch guide (e.g., as represented by arrow 449) that seats the upper cam element between the first upper surface and the second prong of the second cam guide. It will be further appreciated that the open position of the LRV includes a latch index formed integrally with the armature being pressed against a tooth internal to the latch guide via a decompressing spring force.

FIG. 5 shows first view 520, second view 530, and third view 540 which represent subsequent movements of the armature 412 relative to the latch guide 408. As such, second view 530 may follow first view 520, while third view 540 may succeed second view 530. Specifically, first view 520 represents component positions of the LRV when the LRV is in the latched open position (de-energized). Second view 530 shows component positions of the LRV when a finite pulse of voltage is applied to the LRV, and third view 540 depicts component positions of the LRV when the finite pulse of voltage ends, resulting in the unlatched closed position of the LRV. It will be appreciated that the time duration for the transition in FIG. 5 from first view 520 to third view 540 may be significantly short, e.g. a duration of the voltage pulse.

First view 520 indicates the depicted components of the LRV when the LRV is in the latched open position, similar to third view 440 of FIG. 4. Herein, first latch index 4061 is positioned (e.g., seated) in notch 485 within tooth 4082 of latch guide 408, and second latch index 4062 is beneath the first prong 482 of tooth 4081. Additionally, the solenoid actuator is de-energized and the position of the first latch index within notch 485 is maintained by a downward spring force (e.g., as represented by arrow 541).

When the unlatched closed position of the LRV is desired, e.g. upon completing refueling of the fuel tank, the LRV may be energized as shown in second view 530 of FIG. 5. As elaborated earlier, a voltage pulse may be supplied to the LRV which magnetizes the upper stator within the LRV (refer to FIG. 3). In response, the armature 412 is pulled upward, away from the cap of the LRV (e.g., as indicated by arrow 543). Second view 530 depicts first and second unlatched positions of the armature relative to the latch guide during the voltage pulse. A first, earlier position is represented by the dashed outlines of latch indices 4061 and 4062, while a second, later position is represented by the solid outlines of said latch indices. As one example, the first position may be at a time between the initiation and the termination of the voltage pulse, and the second position may be at the time the voltage pulse is terminated.

As a result of the applied voltage pulse, the lower latch index 4082 of the armature is drawn toward first lower surface 486 of latch tooth 4082. As upward motion of the armature 412 relative to the latch guide 408 continues, lower latch index 4062 may move to become in face-sharing contact with the lower surface of latch tooth 4082. Additionally as a result of the applied voltage pulse, first latch guide 4061 moves upward from within the upper notch of latch tooth 4082 to a position above said latch tooth.

After the face-sharing contact between the lower latch index and the first lower surface of latch tooth 4082 has been initiated, the angled surface 486 may impart subsequent upward motion of the armature (e.g., as controlled by the pulse voltage) into rotation between the armature and the latch guide as indicated by bold arrows 547. As such, lower latch index 4062 may rotate and move upward into notch 487 of latch tooth 4082. Similarly, first latch index 4061 may rotate and move upward, out of the upper notch of latch tooth 4082, to a position above second upper surface 494 of latch tooth 4082.

When the voltage pulse is terminated, the LRV is de-energized, and moves to a closed, latched position as shown in third view 540 of FIG. 5. It will be appreciated that each of first view 420 and third view 540 depicts the same unlatched closed position. After the termination of the voltage pulse, a downward spring force (e.g., a decompression of the spring) may be applied to armature 412. In response, the armature 412 is pushed downward, toward the cap of the LRV (e.g., as indicated by arrow 545). Third view 540 depicts first and second positions of the armature relative to the latch guide after the voltage pulse. A first, earlier position is represented by the dashed outlines of latch indices 4061 and 4062, while a second, later position is represented by the solid outlines of said latch indices.

As downward force is imparted on the armature, latch index 4061 may come into face-sharing contact with the second upper surface 494 of latch tooth 4082. After the face-sharing contact between the upper latch index and the second upper surface of latch tooth 4082 has been initiated, the angled surface 494 may impart subsequent downward motion of the armature (e.g., as controlled by the pulse voltage) into rotation between the armature and the latch guide as indicated by bold arrows 547. As such, upper latch index 4061 may rotate and move downward from a position on upper angled surface 494 of latch tooth 4082 to a position between adjacent latch teeth 4082 and 4083. Similarly, lower latch index 4062 may rotate and move downward from a position in lower notch 487 to a position beneath second lower surface 496 of latch tooth 4082. Thus, upon subsequent upward motion of the armature, lower latch index 4082 may be positioned to come into face-sharing contact with the lower surface and allow a subsequent latched opening of the LRV as described with reference to FIG. 4.

Additionally, as downward force is imparted on the armature 412, the bottom surface 435 of upper portion 431 of the armature may come into face-sharing contact with upper surface 409 of latch guide 408. Because the axial position of latch guide 408 is fixed, or in some cases is provided a threshold axial range, the downward motion of armature 412 may be stopped, while the downward force of the spring (indicated by arrow 545) may maintain the valve latched in this position. Thus, in the unlatched closed position of the LRV, the latching may be achieved by the latching of the upper armature on the latch index.

It will be thus appreciated that movement from the latched open position to the unlatched closed position may include: movement of the armature toward the spring that engages the lower cam element with the first lower surface of the second cam guide and imparts rotation of the cam elements away from the first cam guide, and subsequent movement of the armature away from the spring that engages the upper cam element with the second upper surface of the second cam guide and imparts rotation of the armature that seats the upper cam element between the second cam guide and a third cam guide.

Thus, the LRV is capable of assuming at least the two following positions: an unlatched closed position wherein fuel vapor flow through the LRV may be blocked and wherein an upper portion of the armature is latched to an outer surface of the latch guide, and a latched open position allowing fuel vapor flow and wherein a cam element formed integrally on the lower portion of the armature is latched to a cam guiding element within the latch guide.

FIG. 6 depicts an example control routine 600 for refueling a vehicle system, such as the vehicle systems depicted in FIGS. 1-2. In particular, control routine 600 may manage the depressurization of a fuel tank in response to a refueling request from a vehicle operator. Instructions for carrying out routine 600 may be executed by a controller, such as controller 212 of FIG. 2, based on instructions stored on a memory of the controller and in conjunction with signals received from sensors of the engine and fuel system, such as the sensors described above with reference to FIG. 2. The controller may employ actuators of the engine to adjust engine operation, according to the methods described below. Specifically, the controller may employ actuators such as the tank pressure control (TPC) valve and latchable refueling valve (LRV) to depressurize the fuel tank.

At 602, routine 600 estimates engine operating conditions. Engine operating conditions may be estimated, measured, or inferred, and may include various vehicle conditions, such as vehicle speed, as well as various engine operating conditions, such as engine operating mode, engine speed, engine temperature, exhaust temperature, air-fuel ratio, battery state-of-charge (SOC), MAP, MAF, torque demand, horsepower demand, etc.

Next, at 604, routine 600 determines if entry conditions are met. Entry conditions may include engine off conditions when an engine of the vehicle is not in operation. For example, the vehicle may be a hybrid electric vehicle operating in an engine off mode and being powered by batteries in the vehicle. As another example, entry conditions may include a key-off event wherein the vehicle is turned off, e.g., where the vehicle is parked or is not in use and the engine is not running. Entry conditions may be further based on temperatures in the fuel system or evaporative emission control system, e.g., entry conditions during engine-off conditions may be based on a temperature in the fuel system less than a threshold temperature or greater than a threshold temperature. For example, entry conditions may include determining if a temperature in the fuel system is in a predetermined range of temperatures. If entry conditions are not met, routine 600 proceeds to 608 to maintain the status of the TPC valve and LRV. Routine 600 may then end.

If entry conditions are met at 604, method 600 proceeds to 606 to determine if a refueling request occurs. For example, a refuel request may comprise a vehicle operator depressing a button, e.g., refueling button 197, on a vehicle instrument panel in the vehicle, e.g., instrument panel 196. Thus, the refuel request may include manually requesting opening of a fuel cap coupled to the fuel tank. For example, a vehicle operator may provide input to the vehicle system indicating a desire to refuel the vehicle. If a refuel request does not occur at 606, routine 600 may proceed to 608. At 608, routine 600 may include maintaining the status of the TPC valve and LRV. Routine 600 may then end.

If a refuel request occurs at 606, routine 600 continues to 610 to determine whether the fuel tank pressure is greater than a first pressure threshold, Threshold_1. Fuel tank pressure may be greater than the first pressure threshold during ambient conditions, such as hot weather conditions, that increase fuel evaporation in the fuel tank. As such, during cooler weather, fuel vaporization may be lower and fuel tank pressure may be lower than the first pressure threshold between successive tank refueling events.

Fuel tank pressure may be determined through a pressure sensor coupled within the fuel tank, such as pressure sensor 291 of FIG. 2. If the fuel tank pressure is not greater than the first pressure threshold, Threshold_1, routine 600 progresses to 618 to open the LRV. If the fuel tank pressure is greater than the first pressure threshold, Threshold_1, routine 600 continues to 612 to open the TPC valve. By opening the TPC valve, fuel tank pressure may be reduced to the first threshold pressure. By releasing the higher fuel tank pressure (higher than the first pressure threshold, Threshold_1) initially via the TPC valve, fuel tank vent valves are not exposed to significant pressure differentials during refueling events which may close the vent valves, and thus may prevent adequate refueling.

It will be appreciated that the TPC valve is opened responsive to fuel tank pressure being higher than the first pressure threshold. As such, when fuel tank pressure is lower than the first pressure threshold, the LRV may be opened without opening the TPC valve.

The TPC valve may be opened at 612 while maintaining the LRV in a closed position. Herein, the LRV may be at the unlatched closed position and fuel vapors may not flow from the fuel tank to the fuel vapor canister via the LRV. However, fuel vapors may exit the fuel tank towards the fuel vapor canister through the TPC valve. Opening the TPC valve may include actuating a solenoid coupled to the TPC valve. In this way, fuel vapors may be released to the evaporative emission system of the vehicle via the TPC valve. Since the orifice of the TPC valve may be smaller, fuel vapor flow may be slower and fuel tank depressurization may occur gradually. Since fuel tank pressure is higher than the first pressure threshold, an initial slower release of vapors may provide tank depressurization without degrading fuel system components.

Next, at 614, routine 600 determines if fuel tank pressure has decreased to the first pressure threshold. If no, routine 600 continues to 616 to maintain open the TPC valve. If fuel tank pressure is lower than the first pressure threshold, routine 600 proceeds to 618 to open the LRV. As such, the LRV may be opened while maintaining the TPC valve in an open position. Alternatively, the TPC valve may be closed while the LRV is open.

Opening the LRV may include actuating a solenoid, as described in reference to FIG. 3, and adjusting the LRV to the latched open position. In other words, the LRV may be adjusted to the latched open position from the unlatched closed position via a pulse of voltage, as described in FIG. 4. Thus, at 620, a short pulse of voltage is applied to the LRV, and the latch is adjusted such that the LRV is in its latched open position at 622. Further, a first flow rate through the LRV is enabled at 624. As such, fuel vapors from the fuel tank may now flow through the LRV towards the fuel vapor canister. Next, at 626, routine 600 determines if fuel tank pressure has reduced to a second pressure threshold, Threshold_2. In one example, the second pressure threshold may represent a lower fuel tank pressure than the first pressure threshold introduced at 614. As a specific example, the second pressure threshold may be atmospheric pressure and the first pressure threshold may be greater than atmospheric pressure. The controller may unlock the refueling lock only after the fuel tank pressure is at or below the second pressure threshold.

It will be noted that the second pressure threshold may be lower than the first pressure threshold. Specifically, the fuel tank pressure at which the LRV is opened (e.g., the first pressure threshold) may be higher than the fuel tank pressure when the controller unlocks the refueling lock (e.g., the second pressure threshold).

If it is determined at 626 that fuel tank pressure is lower than the second pressure threshold, routine 600 proceeds to 638 to unlock the refueling lock. However, if it is determined that the fuel tank pressure remains higher than the second pressure threshold, routine 600 progresses to 630 to maintain the LRV at the latched open position. As such, maintaining the LRV open at the latched open position allows fuel vapor flow until the fuel tank has sufficiently depressurized (e.g., has reached a pressure at or below the second threshold pressure). After maintaining the LRV open at the latched open position (e.g., for a specified duration), routine 600 returns to 626 to again determine whether the fuel tank pressure has decreased to the second pressure threshold.

When the fuel tank pressure has decreased to (or below) the second pressure threshold, Threshold_2, routine 600 proceeds to 638. At 638, routine 600 includes unlocking the refueling lock. Routine 600 may then end. In this way, refueling may be accomplished only when the fuel tank pressure has decreased to or below the second pressure threshold. In this way, emission amounts of evaporative fuels (e.g., via the refueling lock) may be reduced.

Thus it will be appreciated that a solenoid actuator of a latchable refueling valve may be operated via a controller configured with instructions stored in non-transitory memory and executable by a processor for: in response to a refueling request, opening the tank pressure control valve while maintaining the latchable refueling valve closed at a latched, closed position; and when fuel tank pressure is lower than a first pressure threshold, actuating the latchable refueling valve with a voltage pulse to a latched open position to transfer fuel vapors into the fuel vapor canister.

FIG. 7 depicts an example timeline 700 for venting a fuel tank upon a refueling request using the routine 600 described herein and with regards to FIG. 6. Timeline 700 includes plot 702, indicating the status of a tank refueling request over time. Timeline 700 also includes plot 704, indicating the status of a TPC valve over time; plot 706, indicating whether voltage is applied to the LRV; plot 708 indicating the status of a latchable refueling valve (LRV) over time; plot 710, indicating pressure inside a fuel tank over time; and plot 712, indicating the status of a refueling lock over time. Line 707 represents a first pressure threshold (e.g., Threshold_1 of FIG. 6) for fuel tank pressure. Line 709 represents a second pressure threshold (e.g. Threshold_2 of FIG. 6) for fuel tank pressure. As shown, the second pressure threshold is lower than the first pressure threshold. It will also be noted that the LRV may be varied between an unlatched closed position (e.g., the unlatched closed position of first view 420 at FIG. 4), and a latched open position (e.g., the latched open position of third view 440 in FIG. 4).

At time t1, no tank refuel request is indicated, as shown by plot 702. As such, the status (e.g., position) of the TPC valve and the status (e.g., position) of the LRV are maintained. As shown by plots 704 and 708, the valves are closed at time t1 and thus, are maintained closed. Specifically, the LRV may be at the unlatched closed position. Additionally, the refueling lock is maintained locked, as shown by plot 712.

At time t2, a refueling request is received, as shown by plot 702. Since the fuel tank pressure at time t2 is lower than first pressure threshold (line 707), the TPC valve is not opened, and is maintained closed at time t2. Further, the LRV is opened, as shown by plot 708, and adjusted from the unlatched closed position to the latched open position. Additionally, the fuel cap is maintained in a locked conformation, as shown by plot 712.

It will be appreciated that, with reference to FIG. 4, actuating the latchable refueling valve the voltage pulse at time t2 may include initiating the pulse to bring a lower latch index (e.g., 4062 at FIG. 4) in contact with a lower surface of a latch guide (e.g., surface 496 of latch tooth 4081 at FIG. 4) and to impart rotation therebetween (e.g., as depicted by bold arrow 447 at FIG. 4), and terminating the voltage pulse to seat the first latch index in an upper notch of the latch guide (e.g., as shown at view 440 at FIG. 4). It will be appreciated that after terminating the voltage pulse, a spring force, (e.g., as exerted by spring 310 at FIG. 3) may adjust the axial position of the armature downward.

From time t2 to time t4, the LRV is at the latched open position allowing for fuel vapors to vent from the fuel tank to the evaporative emissions system at the first flow rate. Accordingly, between time t2 and time t3, the fuel tank pressure decreases, as indicated by plot 710. At time t3, fuel tank pressure drops below second pressure threshold (line 709). It will be appreciated that, other than the pulse of voltage provided to the LRV at time t2, the LRV is not supplied with any voltage until time t4, reducing power consumption.

In response to fuel tank pressure dropping below the second pressure threshold, the refueling lock is unlocked and refueling may be initiated at time t3. Refueling may continue until time t4 and since LRV is maintained at the latched open position, fuel vapors from the fuel tank continue to flow to the fuel vapor canister in the evaporative emissions system of the vehicle. Consequently, fuel tank pressure may not change between time t3 and time t4.

At time t4, refueling is completed (as shown by plot 702) and the refueling lock is locked. Further, the LRV may be adjusted from the 1$^{st}$ position (latched open) to the closed position (latched closed) by energizing with a finite pulse of voltage at time t4. In response to the closing of the LRV, fuel vapors in the fuel tank may be trapped within the fuel tank and fuel tank pressure may gradually increase past time t4, as shown by plot 710.

It will be appreciated that, with reference to FIG. 5, actuating the latchable refueling valve via the second voltage pulse 713 at time t4 may include initiating the pulse to bring the lower latch index (e.g., 4062 at FIG. 5) in contact with a lower notch of the latch guide (e.g., notch 487 of latch tooth 4082, as shown at view 530) and terminating the voltage pulse to bring the first latch index to a position between a first tooth and a second tooth of the latch guide (e.g., between teeth 4082 and 4083 of latch guide 408, as shown at view 540). It will be appreciated that after terminating the voltage pulse, a spring force, (e.g., as exerted by spring 310 at FIG. 3) may adjust the axial position of the armature downward so that the a lower surface of the upper armature portion (e.g., surface 431 of upper armature portion 431 at FIG. 5) is brought to a latched (e.g., seated) position against an external surface of the latch guide (e.g., upper surface 409 of latch guide 408 at FIG. 5).

It will be appreciated that the finite pulses of voltage supplied to the LRV at time t2 and time t4 may be supplied for substantially equal durations. To elaborate, a first pulse of voltage 711 applied to the LRV (e.g., to adjust the LRV from unlatched closed to latched open) at time t2 may be similar to a second pulse of voltage 713 applied to the LRV (e.g., to adjust the LRV from latched open to unlatched closed) at time t4. Further, as shown, the duration of the first pulse of voltage 711 and the duration of the second pulse of voltage 713 may be substantially equal.

Additionally, with reference to exploded view 300 of the LRV shown at FIG. 3, the finite pulses of voltage depicted at plot 706 may generate electromagnetic forces greater than a spring force generated by a spring (e.g., 310 at FIG. 3). In this way, motion of an armature within the LRV (e.g., armature 312 at FIG. 3) may be directed against the spring force, thereby allowing the LRV to transition between the unlatched closed and latched open positions.

Thus, voltage is supplied to the LRV for brief moments at time t2 and time t4 to modify the position of the LRV. When the LRV is maintained at either the latched open position or the unlatched closed position, power may not be consumed by the LRV. Accordingly, power may be consumed by the LRV between times t1 and t4 exclusively during transitioning from the unlatched closed position to the latched open position (e.g., at time t2) and during transitioning from the latched open position to the unlatched closed position (e.g., at time t4).

Between time t4 and time t5, a sufficient duration may ensue with multiple refueling events. As such, the vehicle may be operated for a considerable duration. To elaborate, vehicle drive cycle between times t1 and t4 may be distinct and dissimilar from drive cycle of the vehicle between times t5 and t8.

Prior to time t5, there is no refueling request, as shown by plot 702. The TPC valve and the LRV are both closed and the refueling lock is locked. Further, fuel tank pressure prior to time t5 is higher than the first pressure threshold (line 707). For example, pressure in the fuel tank may be higher than the first pressure threshold due to hot weather conditions. As such, a higher ambient temperature (e.g., 100° F. or higher) may increase a rate of fuel evaporation within the fuel tank causing the increase in fuel tank pressure.

At time t5, a distinct refueling request is received. Since the fuel tank pressure at time t5 is higher than first pressure threshold (line 707), the TPC valve is opened first (plot 704). Further, the LRV may be maintained closed at time t5 and fuel vapors may be released from the fuel tank into the fuel vapor canister at a slower pace via the smaller orifice of the TPC valve. Between time t5 and time t6, therefore, fuel tank pressure gradually decreases until at time t6, the fuel tank pressure is at the first pressure threshold (line 707) as shown by plot 710. By releasing the higher fuel tank pressure initially via the TPC valve, fuel tank vent valves may not be exposed to rapid pressure changes during refueling events.

As such, rapid changes in pressure within the fuel tank may cork the vent valves, rendering them unusable for future fuel tank venting events.

At time t6, in response to the fuel tank pressure attaining the first pressure threshold, the LRV may be adjusted to the first position, which is the latched open position. Specifically, a pulse of voltage 716 may be applied to the LRV, as shown by plot 706 at time t6, to adjust the LRV from the unlatched closed position to the latched open position. The pulse of voltage may be applied for a predetermined duration, as at 711 and/or 713, indicated at time t6. The TPC valve may be maintained open.

Between time t6 and time t7, fuel tank pressure decreases, reaching the second pressure threshold at time t7. In response to the fuel tank pressure decreasing to the second pressure threshold at time t7, the refueling lock is unlocked. At time t7, the LRV is at the latched open position and the TPC valve is also open, thereby allowing a transfer of refueling vapors from the fuel tank to the evaporative emissions system. Consequently, fuel tank pressure may not change substantially during refueling between time t7 and time t8.

At time t8, refueling is completed and the refueling lock may be locked. Further, each of the TPC valve and the LRV may be closed. Specifically, a pulse of voltage 717 may be applied to the LRV at time t8 to modify the position of the LRV from the latched open position to the unlatched closed position. As shown, the pulse of voltage to the LRV (plot 706) at time t8 may be applied for a duration similar to that at time t6 (i.e., pulse 715). Thus, the pulse of voltage applied to the LRV to shift its position from latched open to unlatched closed may be substantially equivalent to the pulse of voltage applied to adjust the LRV from the unlatched closed position to the latched open position.

In this manner, a latchable refueling valve (LRV) positioned between a fuel tank and a fuel vapor canister (part of an evaporative emissions system) may allow a faster depressurization of the fuel tank when refueling is requested. The LRV may assume an unlatched closed position and a latched open position. Each of the latched open and the unlatched closed positions may consume nominal (e.g., minimal) power. The LRV may receive a first pulse of voltage to enable transition from the unlatched closed position to the latched open position. Similarly, a second pulse of voltage may be applied to the LRV to adjust the LRV from the latched open position to the unlatched closed position. The first pulse of voltage may be similar to the second pulse of voltage. Specifically, a duration of the first pulse of voltage may be substantially equal to a duration of the second pulse of voltage.

During higher ambient temperatures, the fuel tank may experience a significantly higher fuel tank pressure. Therefore, prior to opening a refueling lock to allow refueling, the fuel tank pressure may be reduced by transferring fuel vapors from the fuel tank to the fuel vapor canister. If fuel tank pressure is higher than a first pressure threshold, a tank pressure control (TPV) valve may be opened first to allow a gradual bleeding of fuel vapors to the canister. By releasing the fuel tank pressure at a slower rate via the TPC valve (which has a smaller orifice), fuel tank vent valves may be protected from substantial pressure gradients which can degrade the fuel tank vent valves. The LRV may be at the unlatched closed position when fuel tank pressure is higher than the first pressure threshold. The transfer of fuel vapors from the fuel tank to the fuel vapor canister via the TPC valve may reduce fuel tank pressure to the first pressure threshold. In response to the fuel tank pressure reaching the first pressure threshold, the LRV may now be opened to enable a faster depressurization. Accordingly, a pulse of voltage may be delivered to the LRV to adjust the LRV from the unlatched closed position to the latched open position. Thus, fuel vapors may flow at a comparatively faster rate from the fuel tank to the fuel vapor canister via the LRV, since the LRV has a larger orifice diameter relative to that of the TPC valve. The refueling lock may be opened after the second pressure threshold is reached in the fuel tank. Upon completion of refueling, each of the TPC valve and the LRV may be closed, and the refueling lock may be locked. Specifically, the LRV may be adjusted from the latched open position to the unlatched closed position via a pulse of voltage.

FIGS. 3-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A latching mechanism for a valve, comprising:
an armature including each of an upper and a lower offset rounded cam element formed integrally thereon and an upper armature portion with a first, larger outer diameter and a lower armature portion with a second, smaller outer diameter, the upper and lower cam elements integrally formed on the lower armature portion,
a rotation sleeve concentrically surrounding the armature and including a plurality of cam guides, the rotation sleeve concentrically surrounding only the lower armature portion,
a solenoid actuator,
a valve core attached to the armature and configured to transmit electromagnetic force into motion against a spring wherein,
movement of the armature toward the spring engages armature cams with the cam guides to impart rotation between the armature and the rotation sleeve, and
movement of the armature away from the spring seats the valve in one of a first or a second desired valve position,
wherein the spring is attached to an upper axial surface of the upper armature portion, and wherein a lower axial surface of the upper armature portion is seated on an upper axial end of the rotation sleeve in the first desired valve position.

2. The latching mechanism of claim 1,
wherein the plurality of cam guides is identical, each cam guide including:
a first prong with a first upper angled surface and a first lower angled surface, and
a second prong with a second upper angled surface and a second lower angled surface;
wherein the first and second upper angled surfaces are parallel to each other and configured to contact the upper cam element;
wherein the first and second lower angled surfaces are parallel to each other and configured to contact the lower cam element; and
wherein the upper angled surfaces are perpendicular to the lower angled surfaces.

3. The latching mechanism of claim 2,
wherein the upper cam element is positioned between the second prong of a first cam guide and the first prong of an adjacent second cam guide at the first desired valve position; and
wherein the upper cam element is seated between the first upper angled surface and the second prong of the second cam guide at the second desired valve position.

4. The latching mechanism of claim 3, wherein movement from the first desired valve position to the second desired valve position includes:
movement of the armature toward the spring that engages the lower cam element with the second lower angled surface of the first cam guide and imparts rotation of the cam elements away from the first cam guide, and subsequent movement of the armature away from the spring that engages the upper cam element with the first upper angled surface of the second cam guide and imparts rotation of the armature that seats the upper cam element between the first upper angled surface and the second prong of the second cam guide.

5. The latching mechanism of claim 4, wherein movement from the second desired valve position to the first desired valve position includes:
movement of the armature toward the spring that engages the lower cam element with the first lower angled surface of the second cam guide and imparts rotation of the cam elements away from the first cam guide, and
subsequent movement of the armature away from the spring that engages the upper cam element with the second upper angled surface of the second cam guide and imparts rotation of the armature that seats the upper cam element between the second cam guide and a third cam guide.

6. The latching mechanism of claim 5, wherein the first desired valve position is an open position and the second desired valve position is a closed position.

7. The latching mechanism of claim 6, wherein the imparting rotation includes a fixed armature moving the rotation sleeve from a first angular position to a second angular position.

8. The latching mechanism of claim 6, wherein the imparting rotation includes a fixed rotation sleeve moving the armature from a first angular position to a second angular position.

9. A system for a hybrid-electric vehicle, comprising:
an engine;
a fuel tank coupled to a fuel vapor canister via each of a first conduit and a second conduit;
a tank pressure control valve coupled in the first conduit between the fuel tank and the fuel vapor canister;
a latchable refueling valve coupled in the second conduit between the fuel tank and the fuel vapor canister, the latchable refueling valve including a lower latch index, an upper latch index angularly offset from the lower latch index, and first and second latch guiding teeth; and
a controller configured with instructions stored in non-transitory memory and executable by a processor for:
in response to a refueling request:
opening the tank pressure control valve while maintaining the latchable refueling valve closed at an unlatched, closed position; and
when fuel tank pressure is lower than a first pressure threshold,
actuating the latchable refueling valve with a voltage pulse to a latched, open position to transfer fuel vapors into the fuel vapor canister,
wherein the lower latch index and the upper latch index include rounded ends configured to contact respective lower planar surfaces and upper planar surfaces of each of the first and second latch guiding teeth.

10. The system of claim 9, wherein actuating the latchable refueling valve to a latched open position includes engaging the lower surface of the first latch guiding tooth with the lower latch index to align the upper latch index with a notch partially formed by the upper surface of the second latch guiding tooth.

11. The system of claim 10, wherein:
the first and second latch indices are formed integrally from an armature, the first and second latch guiding teeth are formed integrally from a latch guide sleeve surrounding the armature, an angular position of the latch guide sleeve is stationary within the latchable refueling valve, and aligning the upper latch index with the notch includes a rotation of the armature within the latch guide sleeve.

12. The system of claim 10, wherein:

the first and second latch indices are formed integrally from an armature, the first and second latch guiding teeth are formed integrally from a latch guide sleeve surrounding the armature, an angular position of the armature is stationary within the latchable refueling valve, and aligning the upper latch index with the notch includes a rotation of the latch guide sleeve about the armature.

\* \* \* \* \*